June 10, 1947. G. H. DOWTY 2,421,871
LEG STRUCTURE FOR MOUNTING AIRCRAFT LANDING ELEMENTS
Filed June 30, 1943 2 Sheets-Sheet 1
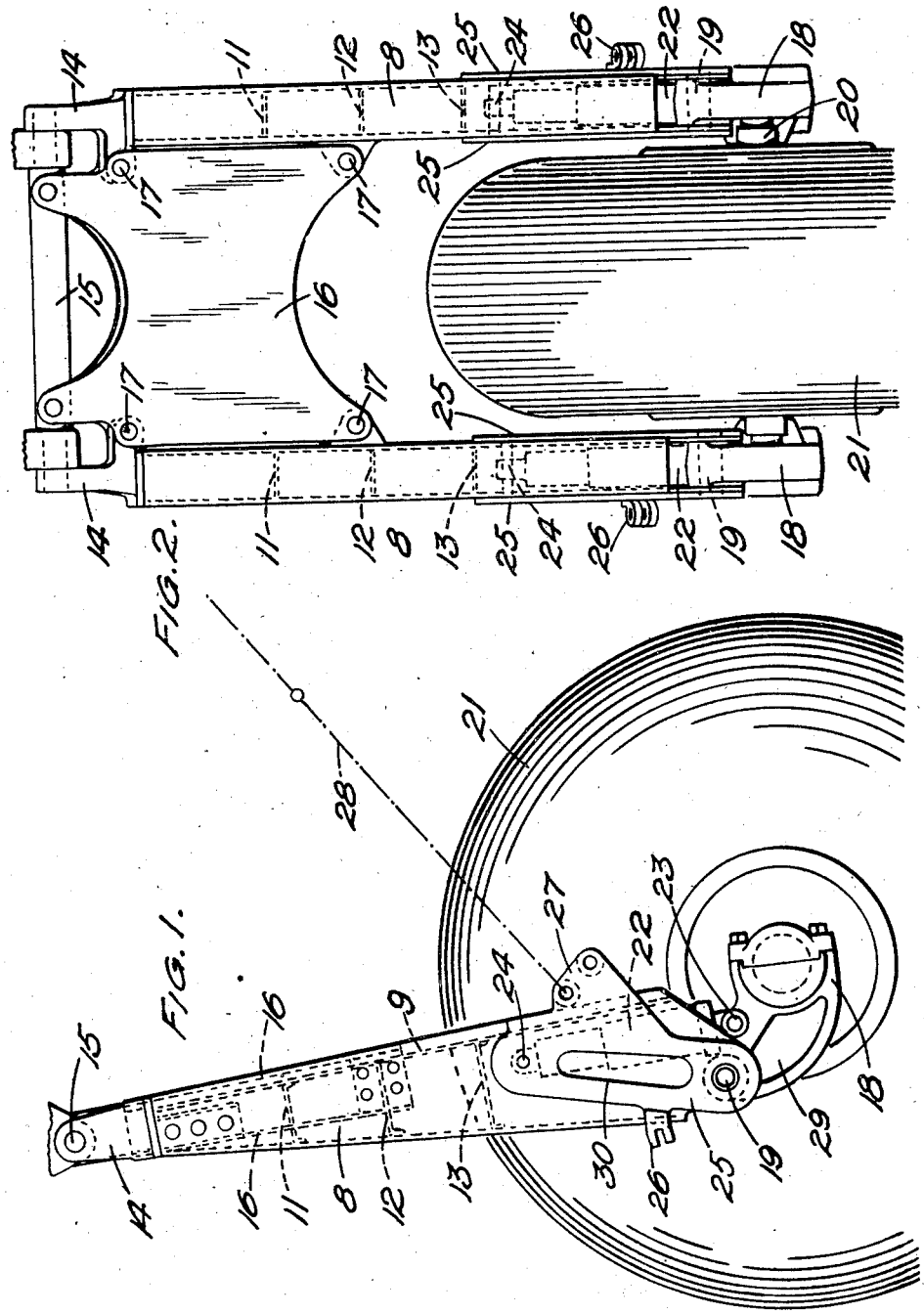

June 10, 1947.  G. H. DOWTY  2,421,871
LEG STRUCTURE FOR MOUNTING AIRCRAFT LANDING ELEMENTS
Filed June 30, 1943  2 Sheets-Sheet 2
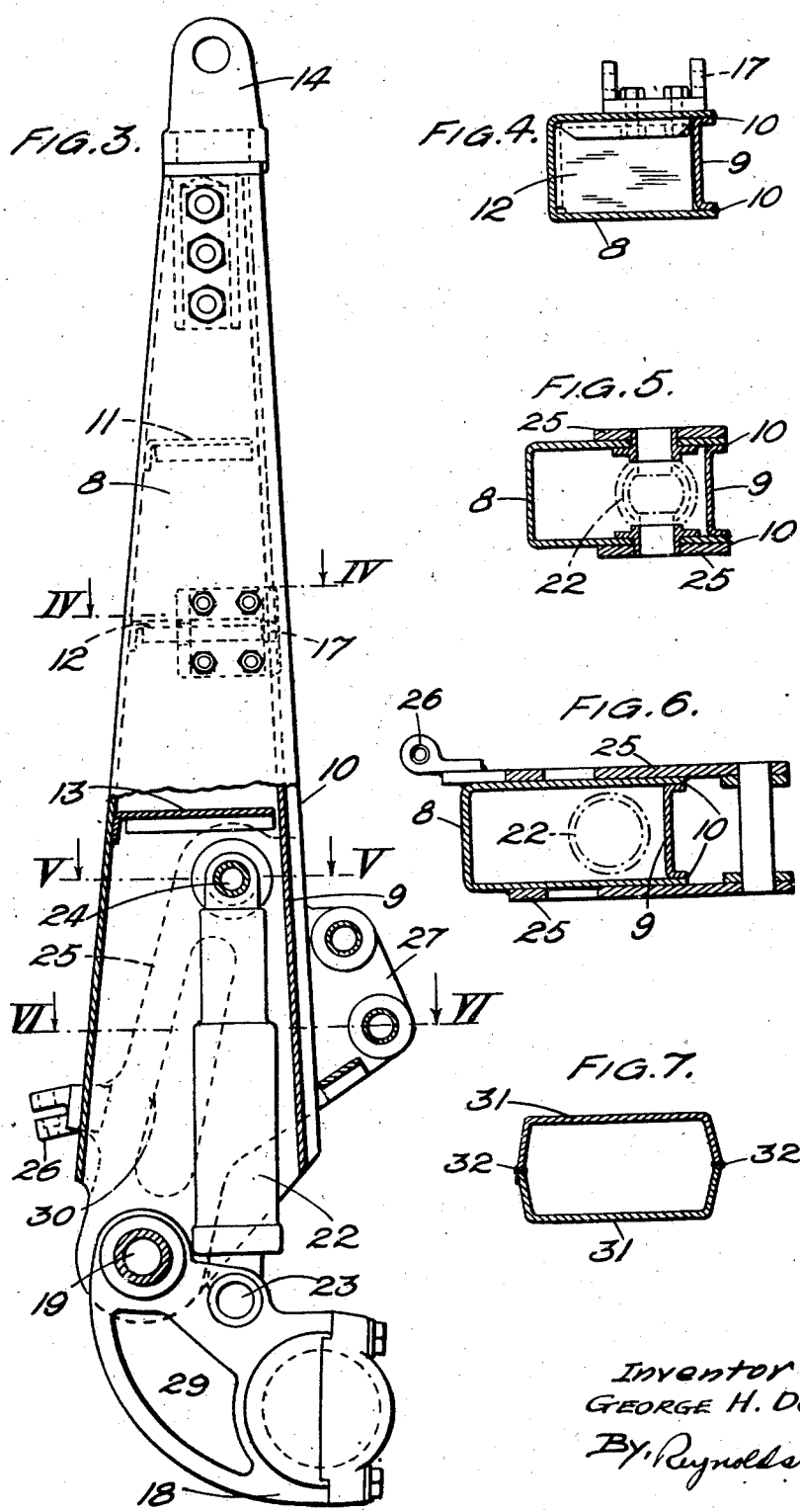
Inventor,
GEORGE H. DOWTY,
By Reynolds & Beach
Attys Patented June 10, 1947

2,421,871

UNITED STATES PATENT OFFICE 2,421,871

LEG STRUCTURE FOR MOUNTING AIRCRAFT LANDING ELEMENTS

George Herbert Dowty, Cheltenham, England

Application June 30, 1943, Serial No. 492,900
In Great Britain July 22, 1942

10 Claims. (Cl. 244—104)

This invention relates to an aircraft landing element mounting embodying a box strut fabricated from sheet material, the landing element being connected thereto by an articulated frame resiliently deformable under landing and taxiing loads.

A primary object of the invention is the provision of a satisfactory landing element mounting capable of rapid and cheap mass production by relatively unskilled labour, if necessary.

A further object of the invention is the provision of a landing element mounting capable of fabrication by methods principally dependent upon sheet metal stamping and welding or other joining processes.

Yet a further object of the invention is the provision of an aircraft landing element mounting incorporating a box strut which, in operation, is mainly relieved of bending loads and shear loads, the main weight of the aircraft being taken primarily by the strut in compression, whereas landing and taxiing loads are taken largely in tension at localised strong points.

Another object of the invention is the provision of an aircraft landing element of which the main structural component comprises a strut, or a plurality of struts, structurally spaced, which, by production from sheet material in hollow box form, can be produced of sheet ferrous metal or alloy, such as steel, and yet be comparable in weight with a similar mounting normally produced from light alloy materials.

Yet another object of the invention is the provision of a landing element mounting which lends itself to a considerable measure of standardisation to the extent that the tapered box strut can be cut off at various different lengths to suit alternative types of aircraft according to the ground clearance required.

Further objects of the invention will become apparent from the ensuing description.

With large and heavy aircraft each landing element can be mounted by two laterally spaced box struts, each incorporating its own resilient mounting means, the two sets of resilient mounting means supporting the landing element spindle or equivalent member bi-laterally. In many cases, however, unilateral mounting will suffice, in which event a single box strut mounts the resiliently deformable frame at its lower end, the frame in turn supporting the landing element spindle. Each mounting may carry a single landing element or a plurality of landing elements side by side or in tandem.

In relation to the resiliently deformable articulated frame, it is to be understood that it may simply involve a lever extending from a pivot on the strut to swing up and down under the influence of landing and taxiing loads against resilient resistance (almost invariably damped resilient resistance) of shock absorber means operating between the lever and strut. In such arrangements the lever mounts the landing element in spaced relationship with respect to the strut, preferably in trail with the lever depending rearwardly downwards, in an unloaded condition of the mounting. The deformable frame, however, may comprise more than simply the lever, shock absorber and intervening strut part; for instance, it may be a quadrilateral frame. In all such constructions, which have come to be known as levered suspension systems, it is preferred that displacements of the relatively movable parts of the shock absorber under the influence of landing and taxiing loads shall be small in relation to the displacements of the landing element involved.

The invention will now be described with reference to the accompanying diagrammatic drawings, of which:

Figure 1 is a side elevation of a typical mounting according to the present invention, shown, in this case carrying a landing element in the form of a wheel;

Figure 2 is a front end elevation corresponding to Figure 1 (i. e., looking at the left-hand side of Figure 1);

Figure 3 is a detail side elevation partly sectioned to show the leg in greater detail than is apparent in Figure 1;

Figures 4, 5 and 6, are, respectively, cross sections on the lines IV—IV, V—V, and VI—VI of Figure 3;

Figure 7 is a plain cross-section illustrating a modified leg section fabricated by welding together two complementary sheet metal stampings.

Referring now to Figures 1 to 6 of the accompanying diagrammatic drawings, the reference numeral 8 indicates the main component of each strut which is, in this instance, constituted by a channel shaped stamping closed by the wall 9 which may be welded along the seams 10. Internally the box struts so produced are hollow and may be reinforced by transverse diaphragms such as those indicated, for example, at 11, 12 and 13. At its upper end each box strut is plugged by the end fitting bolted or otherwise secured in position, which incorporates the lug 14 for connection to the retraction pivot 15. In the case of undercarts for large aircraft, to which the present invention is especially applicable, the landing element is bi-laterally supported and there are, therefore, two laterally spaced box struts connected and braced in spaced relationship by the plate structure including two plates 16 bolted in parallel spaced disposition at 17 to the lugs 14 and to suitable brackets on the box struts spaced downward from their upper ends, as well as to the pivot rod 15.

At the foot of each strut extending downwardly and in trail with respect to the intended direction of travel, there is pivotally mounted a landing element mounting lever 18 which is swingable up and down about the pin joint 19. The trailing end of each lever 18 mounts the landing element spindle 20, preferably in a readily detachable manner and the landing element is indicated by the reference numeral 21. The landing element mounting levers 18 swing up and down under the influence of landing and taxiing loads against the resilient resistance, preferably appropriately damped, imposed by the telescopic shock absorber 22, each operating in compression between the pivot 23 on the lever 18 and the shock absorber anchorage 24 up the box strut.

There is seen at 25 the additional laminations or strengthening plates which, in certain constructions, may be of considerable importance. In practice, the plates 25 operate to brace the articulated resiliently deformable frame constituted by the levers 18, shock absorbers 22 and the plates 25 and the parts of the box struts between the co-operating pin joints 23 and 24. It is noteworthy that the bracing plates or brackets 25, with the shock absorbers 22 operating in compression as they do in the construction illustrated, take landing and taxiing loads largely in tension whereby to counteract any tendency of the pin joints 19 and 24 to rip the sheet material and, incidentally, enabling a lighter gauge sheet material to be used for the box section than might otherwise be possible.

The plates or brackets 25 may project forwardly, as indicated at 26, to provide anchorage for a tractor cable and the rearward projections 27 may serve for lower end anchorages for radius rods, which may be of the breakable type embodying a retraction jack or equivalent operating member, or instead of radius rods, remotely controllable jacks or equivalent retraction means, the position of which is roughly indicated in chain lines at 28 in Figure 1, may operate on the rearward projections 27.

The lever 18 and the plates or brackets 25 may be cut away, as indicated at 29 and 30, respectively, to reduce structural weight, as may also be the box struts and the plate structure 16.

Figure 7 illustrates a typical example of a modified section box strut. The modification amounts to forming the section of the two complementary halves 31 preferably identical, which can be sheet metal stampings welded together as indicated at 32.

Whereas it is desirable and satisfactory from the point of view of appearance to have the deeper channel of the box strut taper upward in depth but not in width, as seen in the drawings, its form may be varied as to the sense of taper and also in degree, or the box strut could be of non-tapering form.

The production of the box strut by welding up sheet stampings is a very convenient method of achieving a streamline form.

In regard to the manner of attachment of the plates or brackets 25, it may be preferred to weld the plates to the box strut over a substantial part of their contacting area in order to achieve a substantial distribution of load and thereby tending further to avoid concentration of load at the pin joints 19 and 24.

The construction lends itself admirably to a certain degree of standardisation. Thus, if the box struts be produced to a standard length and a particular type of aircraft calls for a somewhat lesser length of strut, the variation may be accommodated simply by cutting off preferably the top of the box strut to the appropriate length before plugging the top by the anchorage fitting. Likewise, if a slightly longer length were required, it could be accommodated in many cases by the provision of an extra distance piece or a longer anchorage fitting at the top of the strut.

In manufacture, it is preferable to fabricate the box section and attach or locate the strengthening plates before drilling the shock absorber and lever pivots but, in some cases, eccentric or other adjustable bushes may be provided to define the shock absorber and lever pivots.

It is most important to avoid lateral distortion at the pivots 19 and 24 and it may, therefore, be preferable to insert an accurately machined spacer in the immediate vicinity of those pivots. Owing to its hollow formation, the box strut or equivalent member constituting the leg may be utilised as a container. Thus, it may provide space for a fuel container, hydraulic system, supply reservoir, cooling fluid, etc.

It is to be understood that the examples of the invention illustrated are merely examples, and the invention is not limited to the precise details of construction shown, as modifications may be made therein without departing from the scope of the invention.

What I claim is:

1. An aircraft landing element mounting comprising a pair of box struts fabricated of sheet metal, a resiliently deformable articulated frame interconnecting the lower ends of said struts for connection to a landing element, and a plate having its opposite upright edges connected, respectively, to the upper ends of said struts and to portions thereof spaced a substantial distance from their upper ends, to maintain said struts in relatively fixed, substantially parallel relationship, and an interior transverse bulkhead within each strut at the lower point of connection of said plate, for transmission of stress.

2. An aircraft landing element mounting comprising a pair of box struts fabricated of sheet metal, a resiliently deformable articulated frame interconnecting the lower ends of said struts for connection to a landing element, and two plates disposed in substantially parallel spaced relationship and having their opposite upright edges connected, respectively, to the upper ends of said struts and to portions thereof spaced a substantial distance from their upper ends, to maintain said struts in relatively fixed, substantially parallel relationship, and an interior transverse bulkhead within the strut joining the lower points of connection of the two plates.

3. An aircraft landing element mounting comprising a pair of box struts fabricated of sheet metal, a resiliently deformable articulated frame interconnecting the lower ends of said struts for connection to a landing element, a lug plugging the upper end of each of said struts, a pivot rod interconnecting the lugs of said two struts and supporting the same from the aircraft for upward swinging of said struts into retracted position, and two plates disposed in substantially parallel spaced relationship and having their upper corners secured respectively to said lugs and to said pivot rod, and having their lower corners secured respectively to portions of said struts spaced a substantial distance from their upper ends, to maintain said struts in relatively fixed, substantially parallel relationship to swing as a unit about said pivot rod.

4. An aircraft landing element mounting comprising a pair of box struts fabricated of sheet metal, a lug plugging the upper end of each of said struts, a pivot rod interconnecting the lugs of said two struts and supporting the same from the aircraft for upward swinging of said struts into retracted position, two plates disposed in substantially parallel spaced relationship and having their upper corners secured respectively to said lugs and their lower corners secured respectively to portions of said struts spaced a substantial distance from their upper ends, to maintain said struts in relatively fixed, substantially parallel relationship to swing as a unit about said pivot rod, a lever pivotally connected to the lower end of each strut for connecting a landing element in spaced relation to and disposed between said struts, a telescopic shock absorber received within each strut and pivotally engaged with the lever pivoted to such strut, a pivotal anchorage engaging the upper end of each of said shock absorbers and carried by its respective strut, and reinforcing plates contiguous with opposite sides of each of said struts and secured intimately to said strut sides over a substantial portion of said plates, engaging the pivotal connection of a lever and a strut and the shock absorber anchorage of such strut, and operable to brace the sheet metal of said struts against failure under loads transmitted thereto from said shock absorbers and said levers while operating under landing or taxiing loads.

5. An aircraft undercarriage leg or the like, subject mainly to compressional forces, comprising a box strut fabricated and braced of sheet material in a form having strength adequate to absorb such compressional forces, a lever pivotally connected to the lower end of said strut for connecting a landing element in spaced relation to said strut, a telescopic shock absorber the lower end whereof is operatively engaged with said lever, a shock absorber anchorage engaging the upper end of said shock absorber and carried by said strut intermediate the latter's upper and lower ends, whereby the shock absorber, lever, and intervening strut portion constitute a resiliently deformable articulated frame, of which said intervening strut portion is primarily subject to tensional forces in excess of the resistive capacity of the sheet material of the strut, reinforcement means acting in tension, and extending locally between and connecting the lever's pivot and the shock absorber anchorage, to reinforce such intervening portion of the strut to an extent adequate to absorb locally and without transmission to or through the remainder of the strut, the tensional loads imposed by the landing or taxiing element and shock absorber while landing or taxiing, and a projection on said reinforcing means extending forwardly of the strut and formed to constitute a lug for the reception of a tractor cable or the like.

6. An aircraft undercarriage leg or the like, subject mainly to compressional forces, comprising a box strut fabricated of sheet material so braced and in such form as to afford strength adequate to absorb such compressional forces, a lever pivotally supported in opposite side walls of said strut at its lower end for connecting a landing element in spaced relation to said strut, a telescopic shock absorber the lower end whereof is pivotally engaged with said lever, an anchorage extending between the same side walls of the strut, intermediate the strut's ends, and pivotally engaging the upper end of the shock absorber, whereby the shock absorber, lever, and intervening side wall portions constitute a resiliently deformable articulated frame, of which said intervening side wall portions are primarily subject to tensional forces, during landing and taxying, which may reach values in excess of their resistive capacity, and reinforcing means extending between and connecting the pivotal mountings of the lever and shock absorber, and connected to the intervening side wall portions, to absorb tensional forces locally in the thus-reinforced intervening side wall portions of the strut, without transmission to or through the upper portions of the strut, and a projection on said reinforcing means extending rearwardly of the strut to provide anchorage for a strut-retracting member.

7. An aircraft landing leg comprising a hollow box strut including a deep channel member for disposition with its flanges fore-and-aft, and its web transverse, relative to the aircraft, its web being of uniform width and its flanges increasing in fore-and-aft depth toward the leg's lower end, and a relatively shallow channel member having its web extending between and its flanges secured to the edges of the flanges of said deep channel member, to define an interior space of downwardly increasing fore-and-aft depth, a telescopic shock absorber within such space, pivoted at its upper end intermediate the ends of the leg and adjacent one web member, and a lever pivoted adjacent the opposite web member and extending from the lower end of said strut for connection to a landing element, the lower end of the shock absorber being pivotally connected to said lever.

8. An aircraft landing leg as in claim 7, including also an end fitting plugging and extending from the smaller upper end of the strut, for connection to the aircraft structure.

9. An aircraft landing leg as in claim 7, including also transverse bulkheads interiorly bracing the strut at spaced intervals, and dividing it into compartments, the shock absorber being disposed substantially wholly within the lowermost of said compartments, to swing in a plane parallel to the parallel flanges of the deep channel member.

10. An aircraft landing element mounting comprising a pair of transversely spaced box struts fabricated of sheet material, a resiliently deformable articulated frame interconnecting the lower ends of said struts for connection to a landing element, an end fitting plugging the upper end of each strut and formed for connection to an aircraft structure, and two transverse plates disposed in substantially parallel spaced relation, and each secured at its upper corners to the opposite end fittings, and at its lower corners to portions of said struts spaced a substantial distance below the end fittings, to maintain said struts in relatively fixed, substantially parallel relationship.

GEORGE HERBERT DOWTY.

REFERENCES CITED

The following references are of record in the file of this patent:

UNITED STATES PATENTS

| Number | Name | Date |
|---|---|---|
| 2,280,185 | Bridges | Apr. 21, 1942 |
| 1,955,142 | Minshall | Apr. 17, 1934 |
| 2,251,239 | Dowty | July 29, 1941 |
| 1,977,616 | Berliner | Oct. 23, 1934 |
| 824,550 | Lazerges | June 26, 1906 |
| 1,307,822 | Kling | June 24, 1919 |
| 1,523,106 | Dornier | Jan. 13, 1925 |
| 2,190,358 | Henrichsen | Feb. 13, 1940 |
| 2,264,923 | Waseige | Dec. 2, 1941 |
| 2,338,046 | Lloyd | Dec. 28, 1943 |

OTHER REFERENCES

Publication: "Procedure Handbook of Arcwelding Design and Practice," published by the Lincoln Electric Co., of Cleveland, Ohio, in 1942. Page 479, figures 591 and 592 are referred to.

Pages 545 and 546 of the handbook cited in the office action of February 8, 1944. Figures 718 to 722 are referred to.